US006416687B1

(12) United States Patent
Agostini et al.

(10) Patent No.: US 6,416,687 B1
(45) **Date of Patent: *Jul. 9, 2002**

(54) BLEACHING COMPOSITIONS

(75) Inventors: Andrea Agostini, Grottaferrata; Oreste Todini, Rome, both of (IT)

(73) Assignee: The Procter & Gamble Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,645

(22) PCT Filed: Jul. 30, 1997

(86) PCT No.: PCT/US97/14345

§ 371 (c)(1),
(2), (4) Date: Feb. 22, 1999

(87) PCT Pub. No.: WO98/07654

PCT Pub. Date: Feb. 26, 1998

(30) Foreign Application Priority Data

Aug. 21, 1996 (EP) .......................................... 96202330

(51) Int. Cl.[7] ........................ C01B 15/10; C01B 15/12; C01B 15/06; C01B 11/06

(52) U.S. Cl. ........................... 252/186.42; 252/186.43; 252/186.26; 252/186.33; 252/187.24; 252/187.34; 252/186.27

(58) Field of Search ...................... 252/186.25, 186.26, 252/186.27, 186.28, 186.33, 186.42, 186.43, 187.23, 187.24, 187.34

(56) References Cited

U.S. PATENT DOCUMENTS

| | | | | | |
|---|---|---|---|---|---|
| 3,793,216 | A | * | 2/1974 | Dychdala | 252/187.28 |
| 4,201,756 | A | * | 5/1980 | Saeman et al. | 423/266 |
| 4,292,191 | A | | 9/1981 | Gray | 252/99 |
| 4,526,699 | A | | 7/1985 | Jones et al. | 252/99 |
| 4,880,556 | A | | 11/1989 | Hutchings | 252/156 |
| 5,076,960 | A | | 12/1991 | Hutchings et al. | 252/186.33 |
| 5,078,908 | A | | 1/1992 | Ripley et al. | 252/187.21 |
| 5,089,167 | A | | 2/1992 | Coyne et al. | 252/186.26 |
| 5,126,057 | A | * | 6/1992 | Worley et al. | 210/755 |
| 5,858,945 | A | * | 1/1999 | Lang et al. | 510/224 |
| 5,904,734 | A | * | 5/1999 | Friberg et al. | 8/111 |
| 5,908,580 | A | * | 6/1999 | Lachocki et al. | 252/186.21 |

* cited by examiner

*Primary Examiner*—Joseph D. Anthony
(74) *Attorney, Agent, or Firm*—Richard S. Echler; C. Brant Cook; Kim W. Zerby

(57) ABSTRACT

Bleaching compositions are disclosed which comprise a fabric protective system capable of esterifying the hydroxyl groups of a fabric and a bleach. A method of treating fabrics with such a composition is also disclosed.

32 Claims, No Drawings

BLEACHING COMPOSITIONS

TECHNICAL FIELD

The present invention relates to a bleaching composition which is suitable for laundry applications including hand washing as well as washing with automatic washing machines.

BACKGROUND OF THE INVENTION

Bleach-containing compositions based on hypochlorite bleach or peroxygen bleach are well-known in the art.

However, there are some limitations to the convenience of bleaches. In particular, it is well-known from consumers that the drawbacks associated with the use of bleach-containing compositions especially hypochlorite-based compositions are that said compositions may damage and/or yellow the fabrics which are being bleached.

It is therefore an object of the present invention to provide a bleach-containing composition, suitable for use in laundry application, whereby the fabric whiteness is improved.

It is a further object of the present invention to provide a bleaching composition, suitable for use in laundry application, whereby fabric safety is improved.

Fabrics made of cotton and/or synthetic materials have free hydroxyl groups. It is believed that the fabric damage and/or yellowing that may occur when bleaching a fabric may be due to the oxidation of the hydroxyl groups of the fabric by the bleach. For example, where a liquid hypochlorite-containing composition is applied on the fabric to bleach either in its neat form or in its diluted form, the hypochlorite bleach is present in various forms, including hypochlorous acid, and in the form of free radicals, i.e., molecule fragments having one or more unpaired electrons, such as .Cl, .OH, and/or .ClO. Hypochlorous acid and these free radicals which result essentially from the hypochlorite decomposition pathways are reactive with components having hydroxyl groups such as cotton fabrics or synthetic fabrics, oxidise them and thus contribute to damaging and/or yellowing these fabrics. This phenomenon is emphasised at lower pHs. Indeed, low pHs shift the chemical equilibrium between hypochlorite and hypochlorous acid to the latter, which has been found to contribute to fabric yellowing and fabric damage. Also, it is further believed that at lower pHs these hydroxyl groups are more easily oxidised to form, for example, aldehyde groups which are responsible for the yellowing of the fabric.

Therefore we have now found that it is essential to protect the hydroxyl groups of a fabric from the oxidation they may undergo in the presence of a bleach-containing composition, especially a hypochlorite-containing bleaching composition, in order to improve fabric safety and/or whiteness.

It has been found that the previous objects can be met by formulating a composition comprising a bleach, or a mixture thereof, and a fabric protective system capable of esterifying the hydroxyl groups of a fabric. The compositions of the present invention provide improved fabric whiteness and/or improved fabric safety on fabrics bleached therewith, as compared to the same compositions without the fabric protective system according to the present invention. A particularly preferred fabric protective system of the present invention comprises a boron salt and a catalyst for the esterification of the hydroxyl groups of a fabric by said boron salt.

An advantage of the compositions of the present invention is that said bleaching compositions are suitable for the bleaching of different types of fabrics including natural fabrics, (e.g., fabrics made of cotton, and linen), synthetic fabrics such as those made of polymeric fibres of synthetic origin (e.g., polyamide-lasthane) as well as those made of both natural and synthetic fibres. For example, the bleaching compositions of the present invention based on chlorine bleach such as hypochlorite may be used on synthetic fabrics despite a standing prejudice against using such chlorine bleaches on synthetic fabrics, as evidenced by warnings on labels of commercially available hypochlorite-containing compositions and clothes.

A further advantage of the liquid compositions of the present invention is that said bleaching compositions are suitable for the bleaching of fabrics both when used in diluted conditions, e.g. as a detergent additive, and when used in neat condition, e.g. as a liquid pretreater (spotter).

Bleach-containing compositions like chlorine-containing compositions suitable for bleaching fabrics have been described in the art.

WO 88/05462 discloses a composition for removing stains from fabrics comprising an aqueous solution of trisodium phosphate, sodium hydroxide, sodium hypochlorite and a buffer to maintain a pH of between a bout 10 and 12 such a sodium carbonate, sodium bicarbonate, sodium sesquicarbonate or mixtures thereof. However, no fabric protective system capable of esterifying the hydroxyl groups of a fabric is disclosed, let alone boron salts and a catalyst for the esterification of the hydroxyl groups of a fabric by said boron salts.

EP-A-622 451 discloses compositions comprising hypochloste, sodium hydroxide, a bleach stable perfume and as a buffering system whereby the pH of the diluted composition is buffered to a constant value throughout use, carbonate and/or silicate. However, no fabric protective system capable of esterifying the hydroxyl groups of a fabric is disclosed, let alone boron salts and a catalyst for the esterification of the hydroxyl groups of a fabric by said boron salts.

EP-AU 3 482, EP-AK66 345 and EP-A-688 857 disclose hypochlorite-containing compositions comprising a source of strong alkalinity, a pH buffering means and optionally other types of ingredients such as respectively radical scavengers, polycarboxylate acids of pyridine and periodates. No fabric protective system capable of esterifying the hydroxyl groups o f a fabric is disclosed therein.

UK 1282 906 discloses stabilised aqueous alkali metal hypochlorite solutions comprising as a stabiliser an alkali metal heptonate or boroheptonate. “Alkali metal boroheptonate” as used in UK 1282 906 refers to a mixture of an alkali metal heptonate with either boric acid or an alkali metal metaborate and generally containing two gram moles of alkali metal heptonate per gram atom of boron in the boric acid or metaborate. No laundry application is disclosed. No fabric protective system capable of esterifying the hydroxyl groups of a fabric is disclosed.

BE-749728 discloses an aqueous system comprising an N-hydrogenated compound and a hypohalite such as hypobromite, hypochlorite or hypoiodite in equilibrium with said N-hydrogenated compound, and a buffering system to maintain the pH of said system in a range of 4 to 11 to stabilise it before use. BE-749728 does not disclose a fabric protective system capable of esterifying the hydroxyl groups of a fabric.

U.S. Pat. No. 4,909,956 discloses a bleaching granule which comprises an alkali metal dicloroisocyanurate, a buffering agent and a mitigating agent like sulfamic acid and heterocyclic amides. U.S. Pat. No. 4,909,956 does not disclose a fabric protective system capable of esterifying the hydroxyl groups of a fabric.

SUMMARY OF THE INVENTION

The present invention encompasses a bleaching composition for the bleaching of fabrics, which comprises a bleach, or a mixture thereof, and a fabric protective system capable of esterifying the hydroxyl groups of a fabric. In the preferred embodiment of the present invention the fabric protective system comprises a boron salt and a catalyst for the esterification of the hydroxyl groups of a fabric by said boron salt.

The present invention also encompasses a method of bleaching fabrics wherein said fabrics are contacted with a bleaching composition comprising a bleach, or a mixture thereof, and a fabric protective system capable of esterifying the hydroxyl groups of a fabric.

The present invention further encompasses the use of a catalyst for the esterification of the hydroxyl groups of a fabric by a boron salt, in a bleaching composition comprising a bleach, preferably a chlorine bleach, and a boron salt, to improve the fabric whiteness performance and/or fabric safety of said composition.

DETAILED DESCRIPTION OF THE INVENTION

The compositions of the present invention are bleaching compositions that may be formulated either as solids or liquids. In liquid form, the compositions are preferably but not necessarily formulated as aqueous compositions. Liquid compositions are preferred herein for convenience of use. In the case where the compositions are formulated as solids for example as granular compositions or powder compositions, they are preferably applied on the fabrics to be bleached according to the present invention in a liquid form.

Thus, as a first essential ingredient, the compositions of the present invention comprise a bleach or a mixture thereof. Any bleach known to those skilled in the art may be suitable to be used herein including any chlorine bleach as well as any peroxygen bleach.

Suitable chlorine bleaches to be used herein include any compound capable of releasing chlorine when said compound is in contact with water. Suitable chlorine bleaches include alkali metal dichloroisocyanurates as well as alkali metal hypohalites like hypochlorite and/or hypobromite. Preferred chlorine bleaches are alkali metal hypochlorites. Various forms of alkali metal hypochlorite are commercially available and, although this is not critical for the present invention, it is preferred herein to use sodium hypochlorite.

In the embodiment of the present invention where the compositions herein comprise a peroxygen bleach, as the bleach, preferred peroxygen bleaches are hydrogen peroxide or sources thereof. As used herein a source of hydrogen peroxide refers to any compound which produces active oxygen when said compound is in contact with water. Suitable water-soluble sources of hydrogen peroxide for use herein include percarbonates, preformed percarboxylic acids, persilicates, persulphates, perborates, organic and inorganic peroxides and/or hydroperoxides.

Suitable organic and inorganic peroxides/hydroperoxides for use in the compositions according to the present invention include diacyl and dialkyl peroxides/hydroperoxides such as dibenzoyl peroxide, t-butyl hydroperoxide, dilauroyl peroxide, dicumyl peroxide, and mixtures thereof.

Suitable preformed peroxyacids for use in the compositions according to the present invention include diperoxydodecandioic acid DPDA, magnesium perphthalatic acid, perlauric acid, perbenzoic acid, diperoxyazelaic acid and mixtures thereof.

Accordingly, the compositions according to the present invention typically comprise from 0.01% to 20%, preferably from 0.1% to 15%, more preferably from 0.5% to 8% by weight of the total composition of a bleach or mixtures thereof.

As a second essential ingredient, the compositions according to the present invention comprise a fabric protective system capable of esterifying the hydroxyl groups of a fabric.

The compositions according to the present invention comprise from 0.01% to 20% by weight of the total composition of a fabric protective system, preferably from 0.1 % to 15%, more preferably from 0.1% to 10%, even more preferably from 0.2% to 5%, and most preferably from 0.5% to 1.7%.

It has now been found that the esterification of the hydroxyl groups of a fabric significantly improves the whiteness performance and/or the fabric safety profile of a bleach-containing composition.

Cotton fabrics contain cellulose (i.e., $(C_6H_{10}O_5)_n$). When a bleach-containing composition, e.g., a hypochlorite-containing composition, is used to bleach a cotton fabric, the bleach may react with the hydroxyl substituents of cellulose in position 6, 2, 3 and 5 of the cellulosic ring and thus may introduce new functional groups like carbonylic, aldehydic and/or carboxylic groups. Synthetic fabrics may be made of various synthetic materials like polyamide-elasthane that also comprise hydroxyl groups capable of being oxidized by bleach.

Indeed, the present invention is based on the finding that by esterifying the hydroxyl groups of a fabric, the oxidation of said hydroxyl groups that otherwise occurs when bleaching a fabric with a bleach-containing composition like a hypochlorite-containing composition, is reduced. It is speculated that this oxidation of the hydroxyl groups of a fabric is one of the main mechanisms of fabric damage and/or fabric yellowing. According to the present invention, ester formation can take place on various types of fabrics including not only cotton fabrics but also synthetic fabrics like polyamide-elasthane fabrics, despite the low accessibility and reactivity of the hydroxyl groups of such fabrics improving thereby fabric whiteness and/or fabric safety.

By "improved fabric whiteness", it is meant herein that the whiteness on fabric achieved by using the bleach-containing compositions of the present invention (e.g., those containing hypochlorite) is improved, compared to the whiteness obtained by using the same compositions without said fabric protective system according to the present invention.

By "improved fabric safety", it is meant herein that the damage caused on fabric by using the bleach-containing compositions of the present invention (e.g., those containing hypochlorite) is reduced, compared to the damage caused by using the same compositions without said fabric protective system according to the present invention.

Fabric safety may be evaluated according to UNl (Ente Nazionale Italiano di Unificazione) official methods UNI 8282—Determinazione della viscosita intrinseca in soluzione di cuprietilendiammina (CED).

The esterification mechanism of a given fabric protective system according to the present invention can be evaluated by the following leaching test. To verify the reactivity of the fabric protective system with the hydroxyl groups of a fabric a chromatography column using the fabric as stationary phase and a solution of the fabric protective system as mobile phase can be used. For this test a column of 30×5 cm can be packed with 200 g of a fabric (e.g. sponge cotton or polyamide/elasthane). A solution containing a given amount of the fabric protective system typically in the range from 5 ppm to 100 ppm and a solution containing 0 ppm of said fabric protective system can be leached through the column for the determination of respectively the sample and the blank.

Fabric protective system uptake by esterification with the hydroxyl groups of the fabric can be measured as follows:

((Fabric protective system concentration in sample—Fabric protective system concentration in blank) influent—((Fabric protective system concentration in sample—Fabric protective system concentration in blank)effluent)*100/(Fabric protective system concentration in sample—Fabric protective system concentration in blank)influent.

Typical fabric protective system uptake by esterification with the hydroxyl groups of the fabric according to the above leaching test on sponge cotton is of at least 5%, preferably at least 30%, and more preferably at least 70%. Typical fabric protective system uptake by esterification with the hydroxyl groups of the fabric according to the above leaching test on polyamide/elasthane is of at least 3%, preferably at least 15%, and more preferably at least 60%. Typically the fabric protective system uptake will depend on the weight ratio between fabrics and boron salts.

According to a preferred embodiment of the present invention a suitable fabric protective system capable of esterifying the hydroxyl groups of a fabric is a system comprising a boron salt and a catalyst for the esterification of the hydroxyl groups of a fabric by said boron salt.

In the leaching test as described above conducted with as the fabric protective system a boron salt and said catalyst, the boron salt concentration may be determined according to the Curcumine calorimetric method as described in "Metodo per ia determinazione colorimetrica del Boro, Metodo A alla Curcumina", Manuale UNICHIM n° 169/94 Part II, Acque destinate al consumo umano: Metodi chimici e fisici, Parte II, Raccolta di Metodi UNICHIM-IRSA (Istituto di Ricerca sulie Acque of Centro Nazionale della Ricerche (CNR), Italy).

A possible esterifying mechanism of the hydroxyl groups of a fabric during the bleaching process is believed to be as follows:

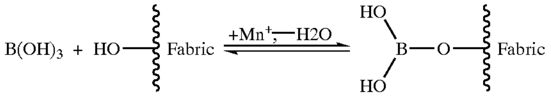

Indeed, it is believed that in the bleaching process in the presence of a catalyst ($Mn^+$), e.g., $ZnCl_2$, the boron salt reacts with the hydroxyl groups of the fabric to form a boron ester. It is believed that the catalyst activates the hydroxyl groups. In other words, it is speculated that the catalyst decreases the activation energy for the boron ester formation, it statistically delocalises the boron atom in the surroundings of the —OH groups, preventing their oxidation and this will result in reduced fabric damage and/or improved fabric whiteness. It is further speculated that $B(OH)_4^-$ the corresponding base of boron species $B(OH)_3$ can participate to the esterification reaction in place or in parallel to the boron species $B(OH)_3$.

It has further been found that increasing the level of said catalyst in a bleaching composition comprising a bleach, typically an alkali metal hypochlorite and a boron salt, proportionally increases the whiteness performance of said composition until a plateau is reached. The concentration of catalyst needed in a given composition comprising hypochlorite and a boron salt to reach said plateau depends on the type of fabric bleached, e.g., cotton and/or polyamide-elasthane fabrics.

Accordingly, the addition of a catalyst for the esterification of the hydroxyl groups of a fabric by a boron salt, as defined herein, to a bleaching composition comprising a bleach, preferably an alkali metal hypochlorite, and a boron salt allows to significantly increase the whiteness performance and/or the fabric safety profile of said composition. Thus, another aspect of the present invention is the use of a catalyst for the esterification of the hydroxyl groups of a fabric by a boron salt, in a bleaching composition comprising a bleach or mixtures thereof, preferably a chlorine bleach, more preferably an alkali metal hypochlorite, and a boron salt, to improve the fabric whiteness performance and/or fabric safety of the bleaching composition.

Suitable boron salt or mixtures thereof to be used according to the present invention include alkali metal salts of borates and alkyl borates and mixtures thereof. Examples of boron salts include boric acid, alkali metal salts of metaborate, tetraborate, octoborate, pentaborate, dodecaboron, borontrifluoride and alkyl borate containing from 1 to 12 carbon atoms, preferably from 1 to 4. Suitable alkyl borate includes methyl borate, ethyl borate and propyl borate. Particularly preferred herein are the alkali metal salts of metaborate, such as sodium metaborate, potassium metaborate, or mixtures thereof.

Boron salts like sodium metaborate and sodium tetraborate are commercially available from Borax and Societa Chimica Larderello under the name sodium metaborate and Borax®.

The compositions according to the present invention comprise from 0.01% to 15% by weight of the total composition of said boron salt or mixtures thereof, preferably from 0.01% to 10%, more preferably from 0.5% to 10%, even more preferably from 0.5% to 5%, even more preferably from 0.7% to 3%, and most preferably from 0.7% to 1.5%.

The catalysts to be used herein catalyse the esterification reaction of hydroxyl groups of a fabric by a boron salt. Suitable catalysts or mixtures thereof to be used according to the present invention include any Lewis acid. Particularly suitable to be used herein are organic and inorganic salts of zinc, aluminium, titanium, magnesium, tin, antimoine, bismuth, and mixtures thereof. Examples of catalysts thus include titanium alcoxides such as tetrabutoxytitanium and titaniumchloride, ZnCl2, Al(OH)3, SnCl2, Bicl2. Particularly preferred herein is ZnCl2.

Zinc chloride is commercially available from Mineral Research and Development Corporation US.

The compositions according to the present invention comprise from 0.001% to 5% by weight of the total composition of said catalyst or mixtures thereof, preferably from 0.01% to 4%, more preferably from 0.015% to 0.8%, and most preferably from 0.02% to 0.2%.

In one embodiment of the present invention a single compound may be used both as source of boron and catalyst like zinc borate.

The fabric protective system according to the present invention like the system comprising a boron salt and said catalyst, may also acts as a pH buffering means due to the presence of the boron salt.

In the preferred embodiment of the present invention wherein the composition herein is a liquid composition comprising an alkali metal hypochlorite as the bleach, the addition of a fabric protective system comprising a boron salt and said catalyst allows a prolonged through-the-bleach buffering action, i.e., allows to maintain the pH of the bleaching solution at a pH of at least 8.5, preferably at least 9.5 for a longer period of time, starting from the moment at which the dilution is completed (i.e., when said composition is diluted in the bleaching solution at a dilution level of 200:1 (water:composition)), as compared to the buffering action obtained with the same composition without said boron salt.

It has been found that the buffering action of the fabric protective system comprising a boron salt and said catalyst allows to reduce the conversion of hypochlorite into hypochlorous acid, one of the species which are most responsible for the fabric damage and/or fabric whiteness, thereby further contributing to improve fabric safety and/or fabric whiteness.

Where the compositions according to the present invention are liquid compositions, the pH can be from 0 to 14. In the embodiment, wherein the liquid compositions herein comprise a peroxygen bleach, the recommended pH range of the composition to achieve good stability is from 1 to 9, preferably between pH 1 and 8, more preferably between pH 1 and 7 and most preferably between 1 and 6. Accordingly the compositions herein may further comprise an acid to adjust pH. The acids of the present invention that may be used for these purposes can be organic or inorganic acids, preferably organic acids such as citric, maleic, oxalic succinic, and tartaric acids or inorganic acids such as sulphuric acid.

In the preferred embodiment, wherein the liquid compositions herein comprise a chlorine bleach, typically an alkali metal hypochlorite, the recommended pH range of the composition is from 8 to 14, preferably from 9 to 13.5, and more preferably from 9.5 to 13.5. It is in this alkaline range that the optimum stability, optimum fabric safety and optimum performance of the hypochlorite is obtained, this both when used in neat or diluted conditions. Accordingly, if appropriate, the compositions of the present invention may comprise a strong source of alkalinity.

Preferred chlorine bleach-containing compositions herein comprise up to 10% by weight of the total composition of said strong source of alkalinity, or mixtures thereof, preferably of from 0.04% to 5% and more preferably of from 0.1% to 2%. Examples of strong sources of alkalinity are alkali metal hydroxides, such as potassium and/or sodium hydroxide, or alkali metal oxides such as sodium and/or potassium oxide.

The preferred compositions of the present invention are aqueous compositions. Thus, they comprise water preferably in an amount of from 60% to 98% by weight of the total aqueous liquid bleaching composition, more preferably of from 80% to 97% and most preferably of from 85% to 97%.

The compositions according to the present invention may further comprise as an optional but preferred ingredient, a pH buffering means on top of the fabric protective system, thereby completing the pH buffering action the fabric protective system may have. Particularly useful to be used herein are alkali metal salts of carbonates, polycarbonates, sesquicarbonates or mixtures thereof. The preferred alkali metal salts to be used herein are sodium and potassium. Particularly preferred are alkali metal salts of carbonate. The preferred alkali metal salt of carbonate is sodium carbonate.

In the embodiment according to the present invention where the fabric protective system comprises a boron salt and a catalyst for the esterification of the hydroxyl groups of a fabric by said boron salt, it is preferred to avoid the use of silicates and/or polysilicates, as a pH buffering means, as they may react with the catalyst, precipitate it and thus partially inactivate it.

The compositions of the present invention can comprise up to 5% by weight of the total composition of a pH buffering means or mixtures thereof, preferably from 0.01 % to 4% and more preferably from 0.02% to 3%

It is speculated that pH buffering means such as sodium carbonate, when added in a bleach-containing composition comprising a fabric protective system capable of esterifying the hydroxyl groups of a fabric, has a further action in addition to the one of the fabric protective system allowing thereby to further improve the fabric whiteness and/or the fabric safety of fabrics bleached with said composition.

The compositions according to the present invention may further comprise other optional ingredients such as bleach-stable surfactants (e.g., nonionic surfactants, anionic surfactants, cationic surfactants, zwitterionic surfactants and amphoteric surfactants), organic or inorganic alkalis, pigments, dyes, optical brighteners, solvents, builders, thickening agents, perfumes, chelating agents, radical scavengers, bleach activators and the like.

In the embodiment of the present invention where the compositions herein comprise a peroxygen bleach, as the bleach, said compositions may comprise a bleach activator up to a level of 10% by weight of the total composition. Suitable bleach activators to be used herein include those belonging to the class of esters, amides, imides, or anhydrides. Examples of suitable compounds of this type are disclosed in British Patent GB 1 586 769 and GB 2 143 231 and a method for their formation into a prilled form is described in European Published Patent Application EP-A-62 523. Suitable examples of such compounds to be used herein are tetracetyl ethylene diamine (TAED), sodium 3,5,5 trimethyl hexanoyloxybenzene sulphonate, diperoxy dodecanoic acid as described for instance in U.S. Pat. No. 4,818,425 and nonylamide of peroxyadipic acid as described for instance in U.S. Pat. No. 4,259,201 and n-nonanoyloxybenzenesulphonate (NOBS). Also suitable are N-acyl caprolactams selected from the group consisting of substituted or unsubstituted benzoyl caprolactam, octanoyl caprolactam, nonanoyl caprolactam, hexanoyl caprolactam, decanoyl caprolactam, undecenoyl caprolactam, formyl caprolactam, acetyl caprolactam, propanoyl caprolactam, butanoyl caprolactam pentanoyl caprolactam or mixtures thereof. A particular family of bleach activators of interest was disclosed in EP 624 154, and particularly preferred in that family is acetyl triethyl citrate (ATC). Acetyl triethyl citrate has the advantage that it is environmental friendly as it eventually degrades into citric acid and alcohol. Furthermore, acetyl triethyl citrate has a good hydrolytical stability in the product upon storage and it is an efficient bleach activator.

The present invention further encompasses a method of bleaching fabrics which comprises the step of contacting said fabrics with a bleaching composition comprising a bleach, or mixtures thereof, and a fabric protective system capable of esterifying the hydroxyl groups of a fabric. In a preferred embodiment, the compositions used in said method of bleaching fabrics are liquid hypochlorite-containing compositions that may further comprise a pH buffering means as defined hereinbefore. Said method according to the present invention improves the fabric whiteness and/or the fabric safety.

The compositions according to the present invention are preferably contacted to fabrics in a liquid form. Indeed, by "in a liquid form" it is meant herein the liquid compositions according to the present invention per se in neat or diluted form, as well as the granular or powder compositions according to the present invention that have been diluted with an appropriate solvent, typically water, before use, i.e., before being contacted to said fabrics.

The compositions according to the present invention are typically used in diluted form in a laundry operation. By "in diluted form" it is meant herein that the compositions for the bleaching of fabrics according to the present invention may be diluted by the user, preferably with water. Such dilution may occur for instance in hand laundry applications as well as by other means such as in a washing machine. Said compositions can be diluted up to 500 times, preferably from 5 to 200 times and more preferably from 10 to 80 times.

More specifically, the method of bleaching fabrics according to the present invention comprises the steps of first contacting said fabrics with a bleaching composition comprising a bleach, preferably an alkali metal hypochlorite, and a fabric protective system capable of esterifying the hydroxyl groups of a fabric, in its diluted form, then allowing said fabrics to remain in contact with said composition, for a period of time sufficient to bleach said fabrics, typically 1 to 60 minutes, preferably 5 to 30 minutes, then rinsing said fabrics in water to remove said composition. If said fabrics are to be washed, i.e. with a conventional composition comprising at least one surface active agent, said washing may be conducted together with the bleaching of said fabrics by contacting said fabrics at the same time with a bleaching composition according to the present invention and said detergent composition, or said washing may be conducted before or after that said fabrics have been bleached. Accordingly, said method according to the present invention allows to bleach fabrics and optionally to wash fabrics with a detergent composition comprising at least one surface active agent before the step of contacting said fabrics with said bleaching composition and/or in the step where said fabrics are contacted with said bleaching composition and/or after the rinsing step when said bleaching composition has been removed from said fabrics.

In another embodiment of the present invention the method of bleaching fabrics comprises the step of contacting fabrics with a liquid bleaching composition according to the present invention, in its neat form, of allowing said fabrics to remain in contact with said bleaching composition for a period of time sufficient to bleach said fabrics, typically 5 seconds to 30 minutes, preferably 1 minute to 10 minutes and then rinsing said fabrics in water to remove the bleaching composition. If said fabrics are to be washed, i.e. with a conventional composition comprising at least one surface active agent, said washing may be conducted before or after that said fabrics have been bleached. In the embodiment of the present invention wherein the liquid bleaching composition of the present invention comprising a bleach, preferably an alkali metal hypochlorite, and a fabric protective system capable of esterifying the hydroxyl groups of a fabric, is contacted to the fabrics in its neat form, it is preferred that the level of bleach, is from 0.01% to 3%, preferably from 0.1 % to 2% more preferably from 0.2% to 1 %. Advantageously, the present invention provides liquid hypochlorite-containing compositions that may be applied neat onto a fabric to bleach, despite a standing prejudice against using hypochlorite-containing compositions neat on fabrics.

Alternatively instead of following the neat bleaching method as described herein above (pretreater application) by a rinsing step with water and/or a conventional washing step with a liquid or powder conventional detergent, the bleaching pre-treatment operation may also be followed by diluted bleaching operation as described herein before either in bucket (hand operation) or in a washing machine.

It is preferred to perform the bleaching methods herein before said fabrics are washed. Indeed, it has been observed that bleaching said fabrics with the compositions according to the present invention prior to washing them with a detergent composition provides superior whiteness and stain removal with less energy and detergent than if said fabrics are washed first, then bleached.

EXAMPLES

The following compositions which further illustrate the present invention were made by mixing the listed ingredients in the listed proportions:

| Compositions (weight %) | I | II | III | IV | V | VI | VII |
|---|---|---|---|---|---|---|---|
| Sodium hypochlorite | 5.0 | 5.0 | 5.0 | 2.5 | 2.5 | 5.0 | 5.0 |
| Sodium hydroxide | 1.3 | 1.3 | 1.3 | 0.7 | 1.4 | 0.7 | 1.4 |
| Sodium carbonate | 1.2 | 1.2 | 1.2 | 1.0 | 1.2 | 1.2 | 1.2 |
| Sodium silicate | — | — | — | — | — | 0.2 | — |
| Sodium metaborate | 1.0 | — | 0.75 | 1.0 | 0.75 | 0.5 | — |
| sodium tetraborate | — | — | 1.0 | — | — | — | — |
| sodium borate | — | 1.0 | — | — | — | — | 1.0 |
| ZnCl2 | 0.1 | 0.1 | 0.2 | — | 0.2 | 0.1 | — |
| Al(OH)3 | — | — | — | 0.1 | — | — | 0.1 |
| Minors and water | | | -balance up to 100%- | | | | |

| | VIII | IX | X | XI | XII | XIII | XIV |
|---|---|---|---|---|---|---|---|
| Sodium hypochlorite | 5.0 | 5.0 | 5.0 | 2.5 | 2.5 | 5.0 | 5.0 |
| Sodium hydroxide | 1.3 | 1.3 | 1.3 | 0.7 | 1.4 | 0.7 | 1.4 |
| Sodium carbonate | 1.2 | 1.2 | 1.2 | 1.0 | 1.2 | 1.2 | 1.2 |
| Sodium silicate | — | — | — | — | — | 0.2 | — |
| Sodium metaborate | 1.0 | — | 0.75 | 1.0 | 0.75 | 0.5 | — |
| sodium tetraborate | — | — | 1.0 | — | — | — | — |
| sodium borate | — | 1.0 | — | — | — | — | 1.0 |
| SnCl2 | 0.1 | — | 0.2 | — | — | 0.1 | — |
| BiCl2 | — | 0.1 | — | — | 0.2 | — | — |
| TiCl3 | — | — | — | 0.1 | — | — | 0.1 |
| Minors and water | | | -balance up to 100%- | | | | |

| | XV | XVI | XVII | XVIII | XIX |
|---|---|---|---|---|---|
| Na Alkylsulphate | 2.0 | 12.0 | 1.7 | 2.0 | 1.7 |
| Dobanol ® 45-7 | 6.4 | 6.0 | — | 6.4 | — |
| Dobanol ® 23-6.5 | 8.6 | 6.0 | — | 8.6 | — |
| Dobanol ® 23-3 | — | — | 1.5 | — | 1.5 |
| Dobanol ® 91-10 | — | — | 1.6 | — | 1.6 |
| Acetyl triethyl citrate | 3.5 | 3.5 | — | 3.5 | — |
| Hydrogen peroxide | 4.0 | 6.0 | 6.8 | 4.0 | 6.8 |
| Sodium metaborate | 1.0 | 1.0 | 1.0 | — | — |
| Sodium borate | — | — | — | — | 1.0 |
| ZnCl2 | 0.1 | 0.1 | 0.1 | 0.2 | 0.1 |
| Minors and water | | -balance up to 100%- | | | |
| H2SO4 up to ph 4 | | | | | |

| | XX | XXI | XXII |
|---|---|---|---|
| Sodium hypochlorite | 1.0 | 1.2 | 1.0 |
| Sodium carbonate | 1.2 | 1.2 | 1.2 |
| Sodium metaborate | 6.0 | 6.5 | 6.0 |
| ZnCl2 | 0.1 | 0.1 | — |
| BiCl2 | — | — | 0.1 |
| Surfactants | 5.0 | 5.0 | 5.0 |
| Minors and water | | -balance up to 100- | |
| Sodium hydroxide up to ph 10.5 | | | |

The Dobanol surfactants are nonionic surfactants commercially available.

All the above compositions provide excellent fabric safety and/or excellent whiteness to fabrics when used to treat fabrics. Compositions I to XIV are particularly suitable for use in diluted conditions as described herein. Compositions XX to XXII are particularly suitable for use in neat conditions.

What is claimed is:

1. A liquid peroxygen bleaching composition for the bleaching of fabrics, which comprises from 0.01% to 20%, by weight of said composition, of a peroxygen bleach, or a mixture thereof, and a fabric protective system comprising a boron salt and a catalyst for the esterification of the hydroxyl groups of a fabric by said boron salt.

2. A composition according to claim 1 wherein said bleach is a hydrogen peroxide and/or water soluble source of hydrogen peroxide selected from the group consisting of percarbonates, preformed percarboxylic acids, persilicates, and persulphates, perborates, organic and inorganic peroxides and hydroperoxides and mixtures thereof.

3. A composition according to claim 1 which comprises from 0.1% to 15% by weight of the total composition of bleach or a mixture thereof.

4. A composition according to claim 3 which comprises from 0.5% to 8% by weight of the total composition, of bleach or a mixture thereof.

5. A composition according to claim 1 which comprises from 0.01% to 20% by weight of the total composition, of said fabric protective system.

6. A composition according to claim 5 which comprises from 0.1% to 15% by weight of the total composition of said fabric protective system.

7. A composition according to claim 6 which comprises from 0.1% to 10% by weight of the total composition, of said fabric protective system.

8. A composition according to claim 7 which comprises from 0.2% to 5% by weight of the total composition of said fabric protective system.

9. A composition according to claim 1 which further comprises up to 5% by weight of the total composition of a pH buffering means or mixtures thereof.

10. A composition according to claim 9 wherein said pH buffering means is a sodium carbonate.

11. A composition according to claim 9 which further comprises from 0.01% to 4% by weight of the total composition of pH buffering means or mixtures thereof, and wherein pH buffering means is an alkali metal salt of carbonate, polycarbonate, sesquicarbonate, or mixtures thereof.

12. A composition according to claim 11 wherein said pH buffering means is a sodium carbonate.

13. A composition according to claim 1 wherein said boron salt is an alkali metal salt of borate, metaborate, tetraborate, octoborate, pentaborate, dodecarboron, borontrifluoride, alkyl borate of from 1 to 12 carbon atoms or mixtures thereof.

14. A composition according to claim 13 wherein said boron salt is sodium metaborate, potassium metaborate or mixtures thereof.

15. A composition according to claim 13 which comprises from 0.01% to 15% by weight of the total composition of said boron salt or mixtures thereof.

16. A composition according to claim 15 which comprises from 0.5% to 10% by weight of the total composition of said boron salt or mixtures thereof.

17. A composition according to claim 16 which comprises from 0.5% to 5% by weight of the total composition of said boron salt or mixtures thereof.

18. A composition according to claim 17 which comprises from 0.7% to 3% by weight of the total composition of said boron salt or mixtures thereof.

19. A composition according to claim 15 wherein said catalyst is a Lewis acid.

20. A composition according to claim 19 wherein said catalyst is an organic or inorganic salt of zinc, aluminium, titanium, magnesium, tin, antimoine, bismuth, or mixtures thereof.

21. A composition according to claim 20 wherein said catalyst is $ZnCl_2$.

22. A composition according to claim 19 which comprises from 0.001% to 5% by weight of the total composition of said catalyst or mixtures thereof.

23. A composition according to claim 22 which comprises from 0.01% to 4% by weight of the total composition of said catalyst or mixtures thereof.

24. A composition according to claim 23 which comprises from 0.015% to 0.8% by weight of the total composition of said catalyst or mixtures thereof.

25. A liquid bleaching composition for the bleaching of fabrics, which comprises from 0.01% to 20%, by weight of said composition, of a bleach selected from the group consisting of alkali metal dichloroisocyanurate. alkali metal hypohalite, and mixtures thereof, and a fabric protective system comprising a boron salt and a catalyst for the esterification of the hydroxyl groups of a fabric by said boron salt.

26. A composition according to claim 25 which comprises from 0.1% to 15% by weight of the total composition of bleach or a mixture thereof.

27. A composition according to claim 25 which comprises from 0.01% to 20% by weight of the total composition, of said fabric protective system.

28. A composition according to claim 25 which further comprises from 0.01% to 4% by weight of the total composition of pH buffering means or mixtures thereof, and wherein pH buffering means is an alkali metal salt of carbonate, polycarbonate, sesquicarbonate, or mixtures thereof.

29. A composition according to claim 25 wherein said boron salt is an alkali metal salt of borate, metaborate, tetraborate, octoborate, pentaborate, dodecarboron, borontrifluoride, alkyl borate of from 1 to 12 carbon atoms or mixtures thereof.

30. A composition according to claim 29 wherein said bleach is an alkali metal hypochlorite.

31. A composition according to claim 30 wherein said alkali metal hypochlorite is sodium hypochlorite.

32. A method of bleaching fabrics comprising the step of contacting said fabrics with a composition according to claim 25.

* * * * *